United States Patent

Jen-Shuy

[11] 4,072,454
[45] Feb. 7, 1978

[54] AUTOMATIC NOODLE MACHINE

[76] Inventor: Ren Jen-Shuy, No. 227, Min Sheng District, Lu Chou Village, Taipei Hsien, China /Taiwan

[21] Appl. No.: 572,396

[22] Filed: Apr. 28, 1975

[51] Int. Cl.² .............................................. A21C 11/22
[52] U.S. Cl. ..................................... 425/101; 425/294; 425/335
[58] Field of Search ............... 425/101, 102, 201, 294, 425/335

[56] References Cited

U.S. PATENT DOCUMENTS

| 625,739 | 5/1899 | Bueck | 425/294 |
| 968,109 | 8/1910 | Barbieri | 425/101 |
| 2,165,718 | 7/1939 | Mun | 425/294 |
| 2,599,894 | 6/1952 | Campbell | 425/101 |
| 3,002,471 | 10/1961 | Jahn | 425/101 |
| 3,565,014 | 2/1971 | Mendoza | 425/101 |

FOREIGN PATENT DOCUMENTS 484,048   8/1953   Italy .................................... 425/294

Primary Examiner—Francis S. Husar
Assistant Examiner—W. R. Briggs

[57] ABSTRACT

An automatic noodle making machine combining the operations of mixing the flour, pressing the flour into strips and cutting the strips. Multiple flour blenders are arranged in timed mechanical sequence to release the dough mixtures into the primary pressing roll set which forms a primary thick flour slice. The slice is cutting into multiple strips which are divided and fed to the next set of pressing rolls. The multiple pressing and cutting steps are followed by a combining pressing in which several courses of strips are recombined into one whereupon the final cutting is performed and the noodles are conveyed away.

5 Claims, 10 Drawing Figures

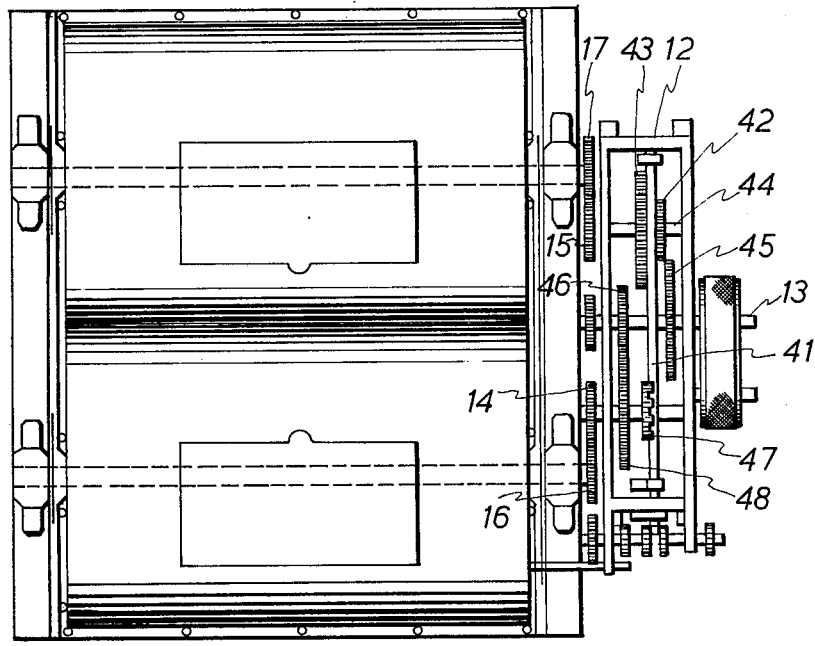
Fig. 4
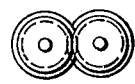
Fig. 6 Fig. 8

AUTOMATIC NOODLE MACHINE

INTRODUCTION

This invention, The Automatic Noodle Machine, can combine the functions of the flour-mixture, flour strip-pressing and strip-cutting into one set machine. From the mixture of the flour and the water, the integrated operation of this machine can make the finished products of noodles or dough slices automatically, and then convey them out of the line. It has the following characteristics:

1. The structure of the Distributor is installed under the Inserting Cutter Sets for the distribution of the flour strip into many courses to decrease the relative rotating speed of the Pressing Roller Sets to the former one's one half the speed of the former roller set.
2. Two flour strips coming from the respective Pressing Roller Set can be piled up and pressed into one strip by an extra Pressing Roller Set to prevent holding in the strip.
3. The structure of multi-courses of Pressing Roller Sets, Inserting Cutter Sets in this machine can refine various noodles and dough slices in different thicknesses and different widths simultaneously.

BRIEF SUMMARY OF THE INVENTION

Because the conventional work of the flour-mixture, flour strip-pressing and strip-cutting is done by the hand, it requires much time and manpower. The Automatic Noodle Machine can improve the productive efficiency and save manpower by an automatic integrated operation from the flour-mixture to the finished products of the noddle or dough slice.

BRIEF DESCRIPTION OF THE SEVERAL VIEWS OF THE DRAWING

FIG. 4 The top view of various mechanical parts, but the Flour-Blender and the Gearbox is omitted.

FIG. 6 The front view of the Inserting Cutter.

FIG. 8 The side view of the Inserting Cutter.

DETAILED DESCRIPTION

The noodles and dough slices are one of the most enjoyable foods of the great majority of people. But the structure and the function of the old style of the conventional noodle-presser has many shortcomings, i.e. because there is no cover the procedure of the noodle pressing is exposed. Since most of the procedure of the flour-mixture, flour strip-pressing and the strip-cutting have been done by hand, it is very non-economical. Not only the hard-working of the laborer, but the negligence of the sanitation can limit the productive efficiency and influence the food industry very badly.

Until today, no noodle presser had the feature of the integrated operation from mixture of the four and the proper amount of water to the finished products of the noodle and the dough slice. The technical difficulty has not been overcome. For example, (1) neither too large nor too small of the diameter of the roll of the first Flour-Pressing Roll Set is needed; its diameter is twice approximately of that of the final Flour-Pressing Roll Set. (2) neither too large nor too small of the space between two rolls of the first Flour-Pressing Roll Set is necessary; its space is ten times approximately of that of the final Flour-Pressing Roll Set. (3) according to the investigation, if the rotating speed of the first Flour-Pressing Roll Set is 10 rpm, the speed of the final Flour-Pressing Roll Set of the conventional type has to be 200 rpm. The fast rotating speed cannot press the noodle properly, but the slow rotating speed of the first Flour-Pressing Roll Set will make the primary noodle unsticking together with the surface of the roll and be losed down to piece. (4) holes appear easily on the primary noodle or the primary flour slice which come from the first Flour-Pressing Roll Set; so it is impossible to press the noodle or flour slice very well by one course only. If done so, the products become hard and can be broken easily.

For the improvement of the above-mentioned shortcomings, this new invention adopts the procedure of piling up many course of the flour slice to one course, and then repeating this process again.

The following is the illustration of the structure and the function of this invention.

Figure 1:
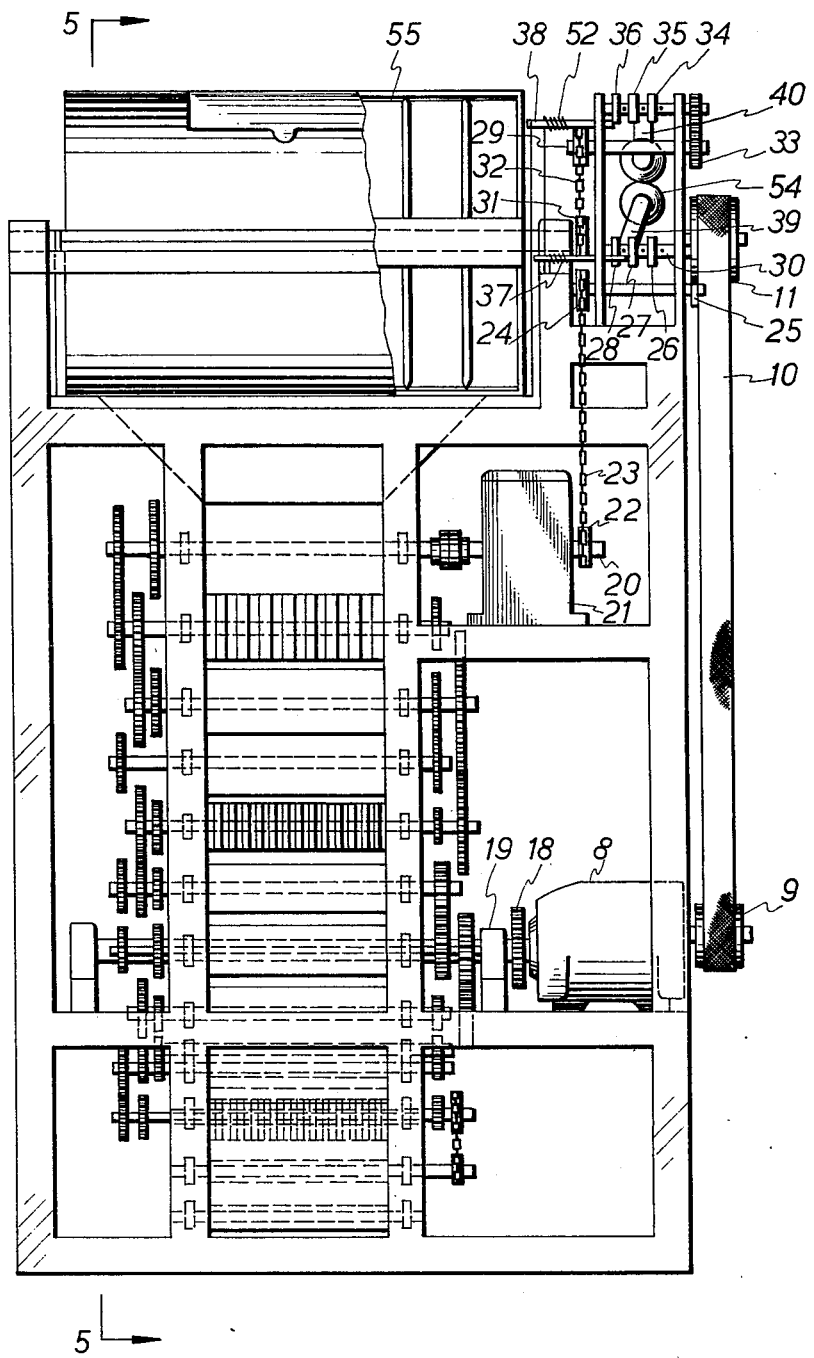
FIG. 1 The front view of The Automatic Noodle Machine. The cover is taken off.
Figures 5, 10:
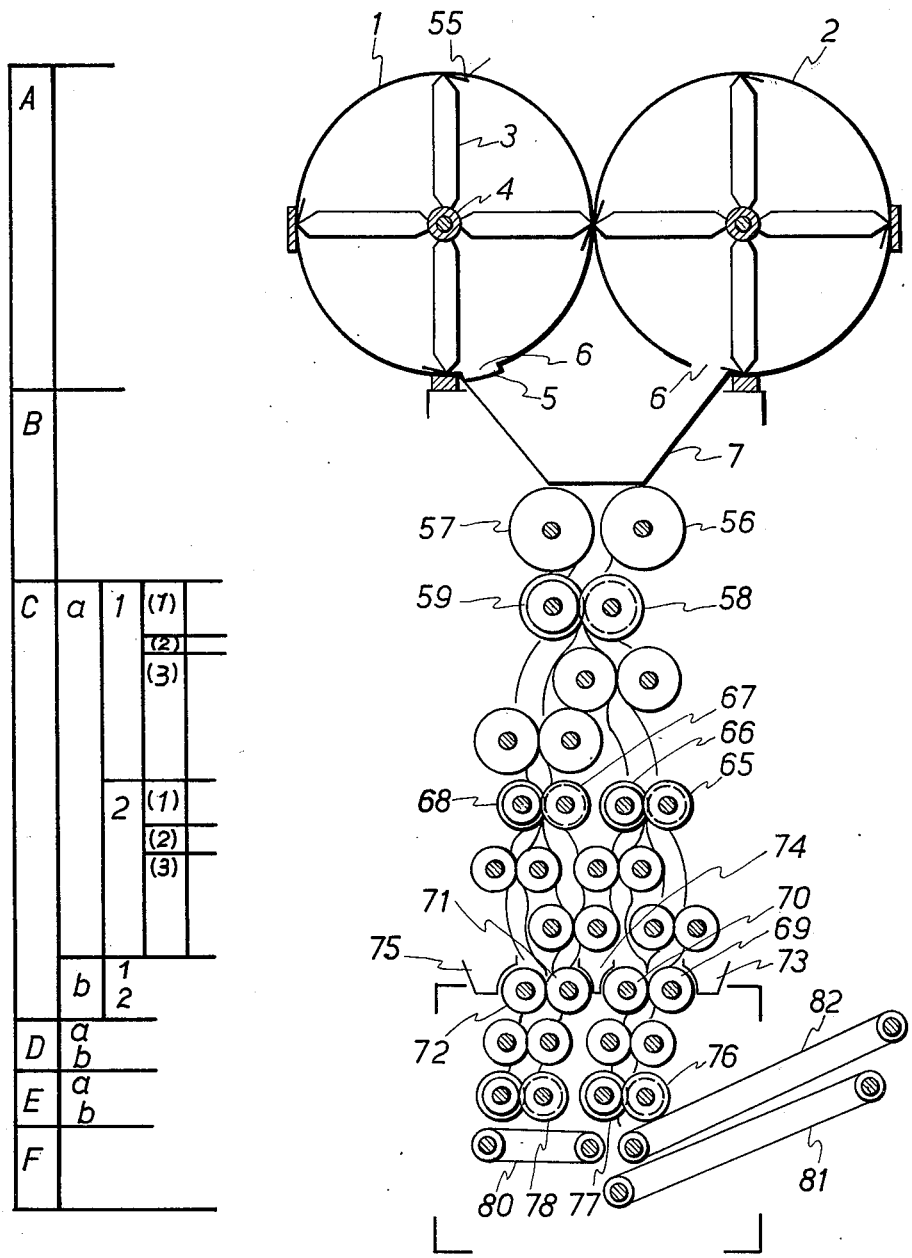
FIG. 5 The sectional view taken along the line 5—5 of the FIG. 1.
FIG. 10 The illustration of the basic principle of this invention.
Figure 7:
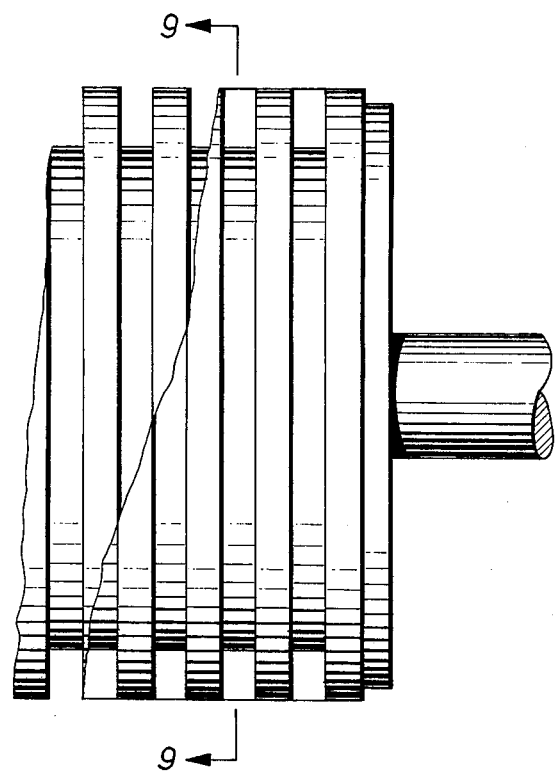
FIG. 7 The front view of some magnifying part of the Inserting Cutter.

Put the flour and proper amount of water into the Blender 1 (FIG. 5) or Blender 2, start the motor to make the Blade 3 rotate along the shaft 4 for mixing homogeneously the flour and the water. (Because of the volume of the Blender is known, the time for the blending can be obtained from testing then, the outlet closing plate 5 will be opened automatically to permit the blended flour paste to flow through the Outlet 6 into the Funnel 7. The structure and the function of the Blender 2 is same as the Blender 1. Because the time between the exiting of the flour paste from the Blender 1 and the re-filling of the flour and the water into the Blender 1 is wasted, the Blender 2 will be filled with the flour and the water after some period of time of the process of the blend in the Blender 1 has passed; that design will make the flour paste flow alternatively out from the Blender 1 and 2 to the Funnel 7. As far as the principle of the outlet closing plate 5 opened automatically at some proper time is concerned, it has the following description: (FIG. 1) the rotation of the motor will be transmitted by two courses through the Reducing Gear 8; first course is the Belt Roller 9, Belt 10 and Belt Roller 11 and go to the Gear Box 12. (FIG. 4) If the rotating speed of the shaft 13 is 244.3 rpm: this speed, through the Gear 14 and 15, is transmitted to the Gear 16, in which the speed is changed to 488.6 rpm, and the Gear 17, in which the speed is changed to 122.15 rpm. These two Gears, 16 and 17, are connected with the shaft of the Blender 1 and 2 respectively to rotate the Blade for the purpose of blending the flour and the water; (FIG. 1) through the Regulating Gear 18 is the second course of the transmission of the speed of the motor; that speed is transmitted to the shaft 19; assuming that the rotating speed of the shaft 19 is known, according to the needed diameter of other rolls and the respective space between them, their rotating speed can be calculated. From this data, the proper gears can be designed for the purpose of the transmission of the dynamic power.

Figure 2:
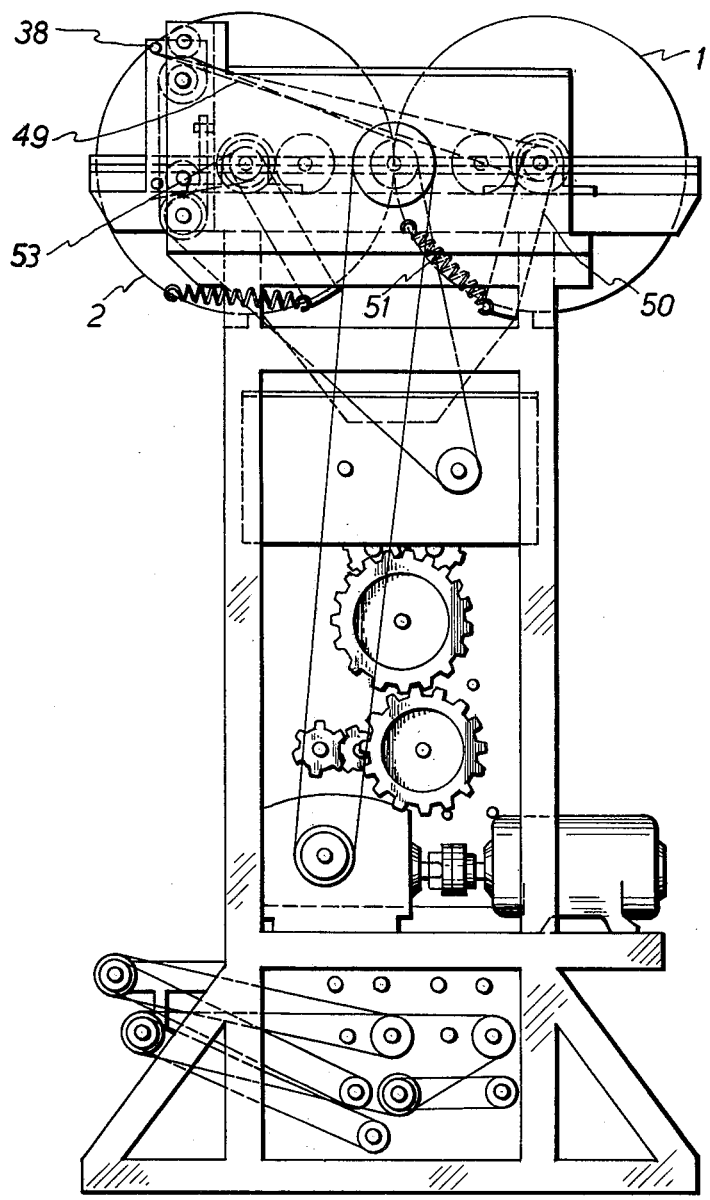
FIG. 2 The right-side view of The Automatic Noodle Machine. (without the cover).
Figure 3:
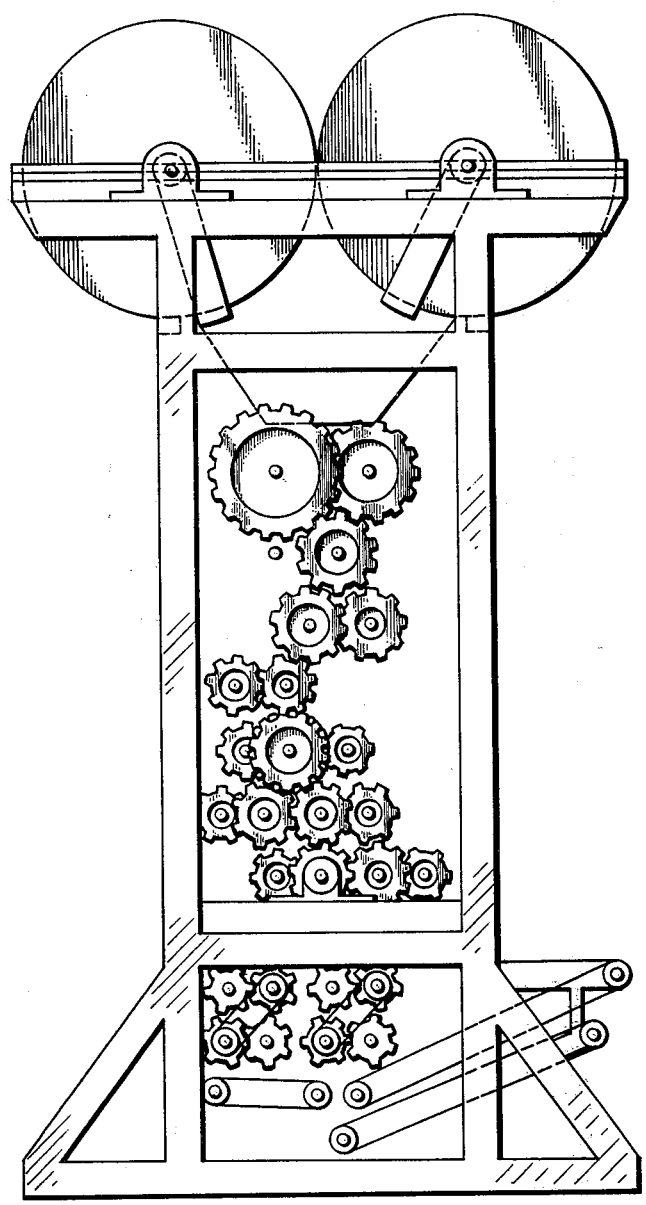
FIG. 3 The left-side view of The Automatic Noodle Machine. (without the cover).

(FIG. 1) From step to step, the gear set will transmit the dynamic power of shaft 19 to the Axis 20 of the Automatic Gear Shifting Box 21; then by the Gear 22, Gear Chain 23 and Gear 24 to the Gear 25 and rotating the Locking Gear Sets 26, 27 and 28; another Gear 29 is operated also by the shaft 30 of the said Locking Gear Sets; the Gear 31, the Gear Chain 32 and the Gear 33 which connection with the Gear 29, will rotate another Locking Gear Sets 34, 35, 36. All of these Locking Gear Sets are designed for the control of the rotating speed of the Shaft 4 of the Blender 1 and 2. Each Locking Gear has two indentations; one of which is the general indentation, that point toward the same direction for the aim of the Blender carrying the flour and the water; the another one, the time indentation, is the charge for releasing the Locking Rod 37, 38 and Rotating Bar 39 and 40. (FIG. 4) Through the Control Rod 41, the Rotating Bar 40 can move the Gear Set 42, 43 along the direction of their shaft 44 to connect with the Gear 45 or 46 of the shaft 13 and to charge the rotating speed of Gear 15, therefore to blend the flour and the water. Through another Control Rod (not be shown in the FIG. 4), the Rotating Bar 39 can control the connection of the Gear Sets 47, 48 with the Gear 45 or 46 to change the rotating speed of the Gear 14. As in the FIG. 4, the connection of the Gear 46 with the Gear 48 is the first gear, and then is the neutral gear; the connection of the Gear 45 with the Gear 47 is the second gear, the connection of the Gear 43 with the Gear 46 is the third gear, the connection of the Gear 42 with the Gear 45 is the fourth gear. (FIG. 2) The Locking Rod 38 is in the left position of Locking Gear 36 of FIG. 1; under this circumstance, the Door Arm 49 is forced beneath the Locking Rod 38; at the other end 50 of this Door Arm control; the outlet closing plate 5 closes the Outlet 6; the spring 51 is pulled. When the timing indentation of the Locking Gear is turned to the oppose position of Locking Rod 38, the Locking Rod 38 will be moved forward from the position of the timing indentation by the force of the Spring 52 (FIG. 1); and the Door Arm 49 is not blocked any more by the Locking Rod 38, the Spring 51 will drag the outlet closing plate 5 back to open the Outlet 6 and the exiting of the flour paste from the Blender is allowed. For the same reason, the Outlet of the other Blender is controlled by the Door Arm 53 and Locking Rod 37 to open the outlet closing plate automatically.

(FIG. 1) Put the Gear 25 apart, to rotate the shaft 30 and make the general indentation of the Locking gear 26, 27 and 28 to oppose the manipulating face of the Gear Box 12; the Door Arm 53 is pulled down and be blocked by the Locking Rod to close the Outlet 6 of the Blender. Move the Rotating Bar 39 to the position of the neutral gear and rotate the shaft 30 a little; because of the movement of the general indentation of the Locking gear 27, the Rotating Bar 39 does not return back; in this time, the flour and the water is poured down to the Blender. Rotate the shaft 30 a little again to make the general indentation opposing the manipulating face of the Gear Box 12; that, from the position of the neutral gear, the Rotating Bar 39 will be put in the position of second gear; and to rotate the shaft 30 to the starting position and connect it with the Gear 25, the shaft 30 begin to rotate. That is the whole process of the content of the flour. Three minutes later, the timing indentation of the Locking gear 26 will oppose the Rotating Bar 39; the Rotating Bar return back to the position of the neutral gear by the force of the Spring 54. The provision of the low gear-shift will protect the gear, that is the purpose of the neutral gear. One minute later again, the timing indentation of the Locking Gear 27 will oppose exactly the Rotating Bar 39, this Rotating Bar will return back to the first gear by the force of the Spring 54. More three minutes later, the timing indentation of the Locking Gear 28 will oppose exactly the Locking Rod 37, and as above-mentioned, the Locking Rod 37 will be moved forward by the force of the Spring; the Outlet of the Blender is opened and the flow out of the homogeneous flour paste is allowed. The mixture of flour with the water is finished by the Blade 3; a scraper is installed in the end of the Blade and touching the inner wall of the Blender tightly for the scraping the adhesive flour out of the inner wall. The procedure of control and the principle of the operation of the Locking Gear Sets 34, 35, 36 is same as the above-mentioned Locking Gear Sets.

Figure 9:
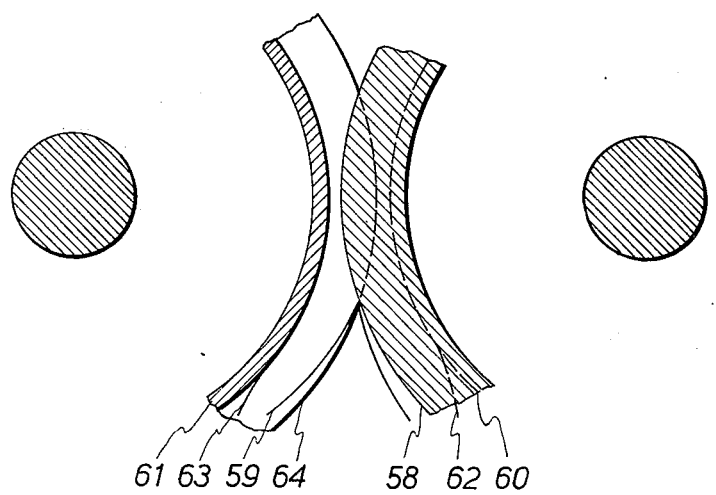
FIG. 9 The sectional view taken along the line 9—9 of the FIG. 7.

(Compare with the FIG. 5 and the FIG. 10) Through the Funnel 7, the mixed flour paste enters into the first Pressing Roll Set 56, 57 to be pressed into the primary thick flour slice. The Inserting Cutter 58, 59 will cut this primary thick flour slice into many equal wide flour strips. Beneath the Inserting Cutter 58, 59, the bottom of the Trough 60, 61, (FIG. 9) and the neighboring Guide Board 62, 63 will take the flour strips leaving off the Inserting Cutter or the Pressing Roll. (under each Inserting Cutter or Pressing Roller, the Guide Board is installed for the flour strips leave off the Cutter or the Roller). The Distributor 64, which will separate the cut flour strips into two courses and guide them into the next Pressing Roll according to the number of odds or evens, is installed under the Inserting Cutter. Then the flour strips will be thined once more and will be cut by another Inserting Cutter Set 65, 66, 67, 68 to become smaller flour strips. All of these smaller strips will be separated into many courses and pressed by the next Pressing Rollers. Meanwhile, for the prevention of the break off of these smaller flour strips which caused by the appearance of the holing on it, two courses of pressed thin flour strips should be piled up and guide into the Pressing Roller 69, 70, 71, 72 that procedure can improve the shortcomings of holing. Above the Pressing Roller 69, 70, 71, 72, there are Dry Flour Powder Containers 73, 74, 75 which release dry flour powder into the surface of the Pressing Roller and the dry flour powder will attach onto the surface of the flour strips when the flour strip pass through the Pressing Roller. The layer of the dry flour powder will make the outer surface of the flour strip glossy and smooth. The Inserting Cutter Set 76, 77, 78, 79 cut all those glossy and smooth flour strips into equal wide noodles and convey them out by the Belt Conveyor 80, 81, 82. The procedure is completed. If the wider dough slice is needed, the procedure going on the Inserting Cutter Set 76, 77, 78, 79 can be removed.

To sum up the above-mentioned structure and productive procedure of The Automatic Noodle Machine has the following five characterics:

1. With the structure of the Distributor, the relative rotating speed of the Pressing Roller can be decreased to one-half the speed of the former roll set.

2. The courses of the flour strips, which can be pressed by two Pressing Roller Sets, will be piled up into one course by a Pressing Roll Set again. The first effect is the prevention of the holing on the flour strips;

the second effect is the improvement property of the softer, stronger and hardly-breaking by means of the combination of two pressed courses of the flour strips into one course.

3. All of the invention is covered to be dust-proof, insect-proof. Three times of the refined procedure will make the finished products of the noodle or the dough slice sanitary, soft and palatable.

4. The structure of multi-course of Pressing Roller Set and Inserting Cutter Set can refine noodles with different thicknesses and dough slices with different widths simultaneously.

5. Refer to the above-mentioned characters 1 to 4, only put the flour and the water into the Blender, this Automatic Noodle Machine will refine the noodles or the dough slices by the process of integrated operation.

I claim:

1. An automatic noodle machine comprising: two blenders in which the axis is horizontal and containing rotary blades secured to a shaft which are utilized for mixing the flour powder and water homogeneously by changeable rotary speed; outlets and related outlet closing means on said blenders for flowing out the blended flour paste into a funnel; means controlling said outlet closing means to open their respective outlets; first pressing roll set under said funnel for pressing said blended flour paste into the primary thick flour slice; first inserting cutter under said first pressing roll set for cutting said primary thick flour slice into many equal wide flour strips; a guide board close to the trough of said first inserting cutter separating said equal wide flour strips from said first inserting cutter; distributor under said first inserting cutter for distributing said equal wide flour strips into two courses to enter into second pressing roll set for to be thinned once more; second inserting cutters and their related guided boards under said second pressing roll set for cutting said flour strips which come from said second pressing roll set into many equal wide flour strips; distributors under said second inserting cutter for distributing one course of the flour strip which comes from said second inserting cutter into two courses again and entering them into third pressing roll sets which are set under said second inserting cutter; fourth pressing roll sets under said third pressing roll sets for piling up two courses of said flour strip which come from said third pressing roll sets into one course; dry flour powder container above said fourth pressing roll sets for releasing the dry flour powder onto the surface of said fourth pressing roll sets and thus the surface of said flour strips; fifth pressing roll sets under said fourth pressing roll sets for pressing the flour strips which come from said fourth pressing roll sets; third inserting cutter under said fifth pressing roll sets for cutting said flour strips which come from said fifth pressing roll sets into the noodles; belt conveyer for transporting said noodles out.

2. An automatic noodle machine as claimed in claim 1 having means for rotating the shaft of each of the blenders in changeable rotary speed comprises: one rotating bar for moving the control rod to control the engagement of the blender shaft with a gear secured thereto with gears of different sizes that are part of a set of gears that are mechanically linked to a motor so as to obtain different blender shaft rotation speeds for the primary motor of this machine to get different speed for mixing the flour powder and water; three locking gears which are affixed to a common shaft and are mounted to engage with said set of gears and which have general indentations and timing indentations to permit one end of said rotating bar, under the function of a spring, to turn to different positions at predetermined points in the rotation of the locking gears to complete said engagement of the blender shaft to the said set of gears.

3. An automatic noodle machine as claimed in claim 1 wherein said means for controlling the outlet closing means to open its respective outlet comprises: a spring in connection with said outlet closing means to bias the closing means so that the outlet is open; a door arm which at one end is connected with said outlet closing means and at the outer end with a locking rod that moves said arm and thereby said closing means forward to close said outlet; three locking gears mounted to engage with said set of gears that are mechanically linked to a motor and having general indentations and timing indentations so that by means of the spring said locking rod moves through said timing indentation at some predetermined points in the rotation of locking gears to permit one end of said door arm to lift to open the outlet.

4. An automatic noodle machine as claimed in claim 1 wherein each said inserting cutter comprises: two rollers with square convex-concave profiles on their respective surfaces, means mounting the rollers so that their corresponding convex-concave profiles mesh to form cutting surfaces in order to cut one course of the flour strip, which enters into this inserting cutter, into two courses, of which each course has many equal wide flour strips; and a guide board at the bottom of said square concave troughs of each roller for separating the flour strips from said roller.

5. An automatic noodle machine as claimed in claim 1 wherein each said distributor under said inserting cutter comprises two sheets which are connected together at one of their edges to form structure with an apex which structure is positioned below and tangent to said rollers and to said inserting cutter so that the two courses of flour strip separated from said inserting cutter by means of the guide boards will be kept in their respective course.

* * * * *